(12) United States Patent
Masters

(10) Patent No.: US 12,373,274 B2
(45) Date of Patent: Jul. 29, 2025

(54) SELECTIVE RE-EXECUTION OF INSTRUCTION STREAMS FOR RELIABILITY

(71) Applicant: Google LLC, Mountain View, CA (US)

(72) Inventor: Jonathan Charles Masters, Boston, MA (US)

(73) Assignee: Google LLC, Mountain View, CA (US)

( * ) Notice: Subject to any disclaimer, the term of this patent is extended or adjusted under 35 U.S.C. 154(b) by 59 days.

(21) Appl. No.: 18/123,567

(22) Filed: Mar. 20, 2023

(65) Prior Publication Data

US 2024/0320072 A1 Sep. 26, 2024

(51) Int. Cl.
*G06F 11/07* (2006.01)

(52) U.S. Cl.
CPC ...... *G06F 11/0751* (2013.01); *G06F 11/0721* (2013.01); *G06F 11/0766* (2013.01)

(58) Field of Classification Search
CPC ............. G06F 11/0751; G06F 11/0721; G06F 11/0766
USPC ........................................................ 714/819
See application file for complete search history.

(56) References Cited

U.S. PATENT DOCUMENTS

| 5,961,634 | A | 10/1999 | Tran |
| 5,966,544 | A | 10/1999 | Sager |
| 7,865,770 | B2 * | 1/2011 | Quach ................. G06F 9/3858 714/45 |
| 9,262,171 | B2 | 2/2016 | Golla et al. |
| 9,354,884 | B2 | 5/2016 | Comparan et al. |
| 11,086,713 | B1 * | 8/2021 | Sapuntzakis .......... G06F 3/0673 |
| 2003/0097546 | A1 * | 5/2003 | Taylor ................. G06F 15/7867 712/226 |
| 2004/0139372 | A1 * | 7/2004 | Moyer ................ G06F 11/0793 714/E11.144 |
| 2009/0183035 | A1 * | 7/2009 | Butler ................. G06F 11/1641 714/48 |

(Continued)

FOREIGN PATENT DOCUMENTS

| EP | 3454217 A1 * | 3/2019 | .......... G06F 11/1004 |
| EP | 3462621 A1 * | 4/2019 | .......... G06F 11/1004 |

OTHER PUBLICATIONS

Charyyev et al., Towards Securing Data Transfers Against Silent Data Corruption, 2019, IEEE, pp. 262-271. (Year: 2019).*

(Continued)

*Primary Examiner* — John J Tabone, Jr.
(74) *Attorney, Agent, or Firm* — Lerner David LLP

(57) ABSTRACT

The technology is generally directed to detecting silent data corruption by selectively re-executing instructions. A renamer may receive decoded instructions from an instruction cache. The renamer may identify one or more of the decoded instructions that can be performed out of order. The reorder buffer may be configured to track instructions that are to be re-executed for purposes of computing their value a second time and comparing the value from the second computation with a value from a first computation. Prior to retiring, or completing, an instruction, an initial result of executing the instruction a first time may be compared with a re-execution result of re-executing the instruction a second or nth time. If the comparison indicates there is a different initial result than the re-execution result, an indication of possible silent data corruption may be generated for the instruction.

13 Claims, 4 Drawing Sheets

(56) References Cited

U.S. PATENT DOCUMENTS

| | | | | |
|---|---|---|---|---|
| 2012/0047351 | A1* | 2/2012 | Morrison | G06F 11/1405 |
| | | | | 712/E9.06 |
| 2017/0337047 | A1* | 11/2017 | Shrivastava | G06F 9/30043 |
| 2017/0344412 | A1* | 11/2017 | Ono | G06F 11/1004 |
| 2019/0013965 | A1* | 1/2019 | Sindhu | H04L 12/4633 |
| 2020/0192742 | A1 | 6/2020 | Boettcher et al. | |
| 2021/0149763 | A1* | 5/2021 | Ranganathan | G06F 12/0891 |
| 2021/0281618 | A1* | 9/2021 | Mosur | G06F 9/544 |
| 2021/0326225 | A1* | 10/2021 | Mueller | G06F 11/1666 |
| 2024/0320072 | A1* | 9/2024 | Masters | G06F 11/0751 |

OTHER PUBLICATIONS

Li at al., Preventing Silent Data Corruptions from Propagating During Data Reconstruction, Dec. 2010, IEEE, vol. 59, No. 12, 1611-1624. (Year: 2010).*

Extended European Search Report for European Patent Application No. 23188767.0 dated Jan. 29, 2024. 12 pages.

Li et al., "Epipe: A low-cost fault-tolerance technique considering WCET constraints," Journal of Systems Architecture, Dec. 31, 2013 (Dec. 31, 2013), 59(10):1383-1393.

Oz and Arslan, "A Survey on Multithreading Alternatives for Soft Error Fault Tolerance," ACM Computing Surveys, Mar. 27, 2019 (Mar. 27, 2019), 52(2):1-38.

Parashar et al., "SlicK: Slice-based Locality Exploitation for Efficient Redundant Multithreading," Operating Systems Review, Oct. 20, 2006 (Oct. 20, 2006), 40(5):95-105.

E. Rotenberg, "AR-SMT: a microarchitectural approach to fault tolerance in microprocessors," Digest of Papers. Twenty-Ninth Annual International Symposium on Fault-Tolerant Computing (Cat. No. 99CB36352), 1999, pp. 84-91, doi: 10.1109/FTCS.1999. 781037.

Garcia Ordaz et al, "A Reorder Buffer Design for High Performance Processors", Computacion y Sistemas, vol. 16 No. 1, 2012, pp. 15-25.

Kim et al., "Understanding Scheduling Replay Schemes", Department of Electrical and Computer Engineering University of Wisconsin? Madison, retrieved from the internet on Feb. 7, 2023<URL:https://pharm.ece.wisc.edu/papers/hpca2004ikim.pdf>, 12 pages.

Todd M. Austin, DIVA: A Reliable Substrate for Deep Submicron Microarchitecture Design, Published in the Proceedings of the 32nd International Symposium on Microarchitecture, Nov. 1999.

* cited by examiner

SELECTIVE RE-EXECUTION OF INSTRUCTION STREAMS FOR RELIABILITY

BACKGROUND

As chips continue to advance and decrease in size, the transistors and lines within the chip may be small enough such that small electrical fluctuations can cause errors. The errors typically contribute to data loss and corruption. The data loss and corruption can impact long-protected memory, storage, networking, and processors. These errors, often referred to as silent data corruption or silent data error, can permanently corrupt data if not identified and corrected. Typically, silent data corruption is mitigated by duplicating the logic in the processor and performing a comparison between all the instructions, lock-step computing, or re-executing instructions after detecting an error. These mitigation techniques can be costly in terms of space on the chip by requiring additional memory and other components. Further, these mitigation techniques are costly in terms of time by having to re-execute all the instructions.

BRIEF SUMMARY

The present disclosure describes systems and methods for selectively identifying instruction streams to be re-executed to identify possible silent data corruption. For example, a renamer may identify instructions that can be performed out of order. The renamer may utilize a reorder buffer to dispatch and receive the results of the instructions. For example, the reorder buffer may track calculations, dependencies, and the results of the instructions. In some examples, the reorder buffer may track which instructions were selected to be re-executed. For example, the selected instructions may include: a certain percentage of the overall instructions, instructions performed during a certain period of time, instructions that have been identified by hint instructions or a complier cost model, etc. Instructions that are to be re-executed may be performed "n" number of times, where "n" is a value greater than one. Prior to retiring the instructions in order, an initial result of executing the instruction a first time may be compared to a re-execution result from re-executing the instruction the nth time. If the initial result is different than the re-execution result, an indication of possible silent data corruption may be generated for the instruction.

One aspect of the technology is directed to method for detecting silent data corruption. The method may comprise receiving, at a buffer, a plurality of instruction streams, executing, using a first processor, the plurality of instruction streams, the executing producing an initial result corresponding to each of the plurality of instruction streams, selecting at least one of the plurality of instruction streams for error checking, re-executing the at least one selected instruction stream, the re-executing producing a re-execution result, comparing the initial result to the re-execution result, and when the initial result does not match the re-execution result, generating an indication of possible silent data corruption.

Selecting the at least one of the plurality of instruction streams may comprise identifying, based on hint instructions, a beginning block and an ending block of a respective instruction streams. Selecting the at least one of the plurality of instruction streams may comprise identifying one or more instructions of the plurality of instructions streams that can be performed out of order. Selecting the at least one of the plurality of instruction streams may comprise identifying a predetermined percentage of the plurality of instruction streams, and selecting the at least one of the plurality of instruction streams based on the identified predetermined percentage. Selecting the at least one of the plurality of instruction streams may comprise identifying one or more instruction streams of the plurality of instruction streams that are executed during a pre-determined period of time, and selecting the at least one of the plurality of instruction streams from the identified one or more instruction streams.

Re-executing the at least one selected instruction stream may be performed using an out-of-order apparatus within a microprocessor core. Comparing the initial result to the re-execution result may be performed by one or more processors external to a microprocessor core.

The method may further comprise buffering the at least one selected instruction stream prior to the re-executing. The method may further comprise storing the initial result in a first physical register and storing the re-execution result in a second physical register that is separate from the first physical register.

Generating an indication of possible silent data corruption may comprise flagging the first processor for possible corruption. Flagging the at least one selected instruction stream may comprise setting a bit.

Generating an indication of possible silent data corruption may comprise flagging the first processor for possible corruption. Re-executing the at least one selected instruction stream may be performed using the first processor. Re-executing the at least one selected instruction stream may be performed using a second processor different than the first processor. When the initial result matches the re-execution result, the at least one selected instruction stream may be retired to architecture of a computer processing unit.

Another aspect of the technology is directed to a system for detecting silent data corruption comprising a memory unit configured to temporarily store instruction streams, one or more processors, and a renamer including a reorder buffer. The memory may be configured to temporarily store instruction streams. The one or more processors may be configured to select at least one of the instruction streams for error checking. The reorder buffer may be configured to receive an initial result from execution of the at least one of the instruction streams and receive a re-execution result from re-execution of the at least one instruction streams. The one or more processors may be further configured to compare the initial result to the re-execution result, and when the initial result does not match the re-execution result, generate an indication of possible silent data corruption.

DETAILED DESCRIPTION

Figure 1:
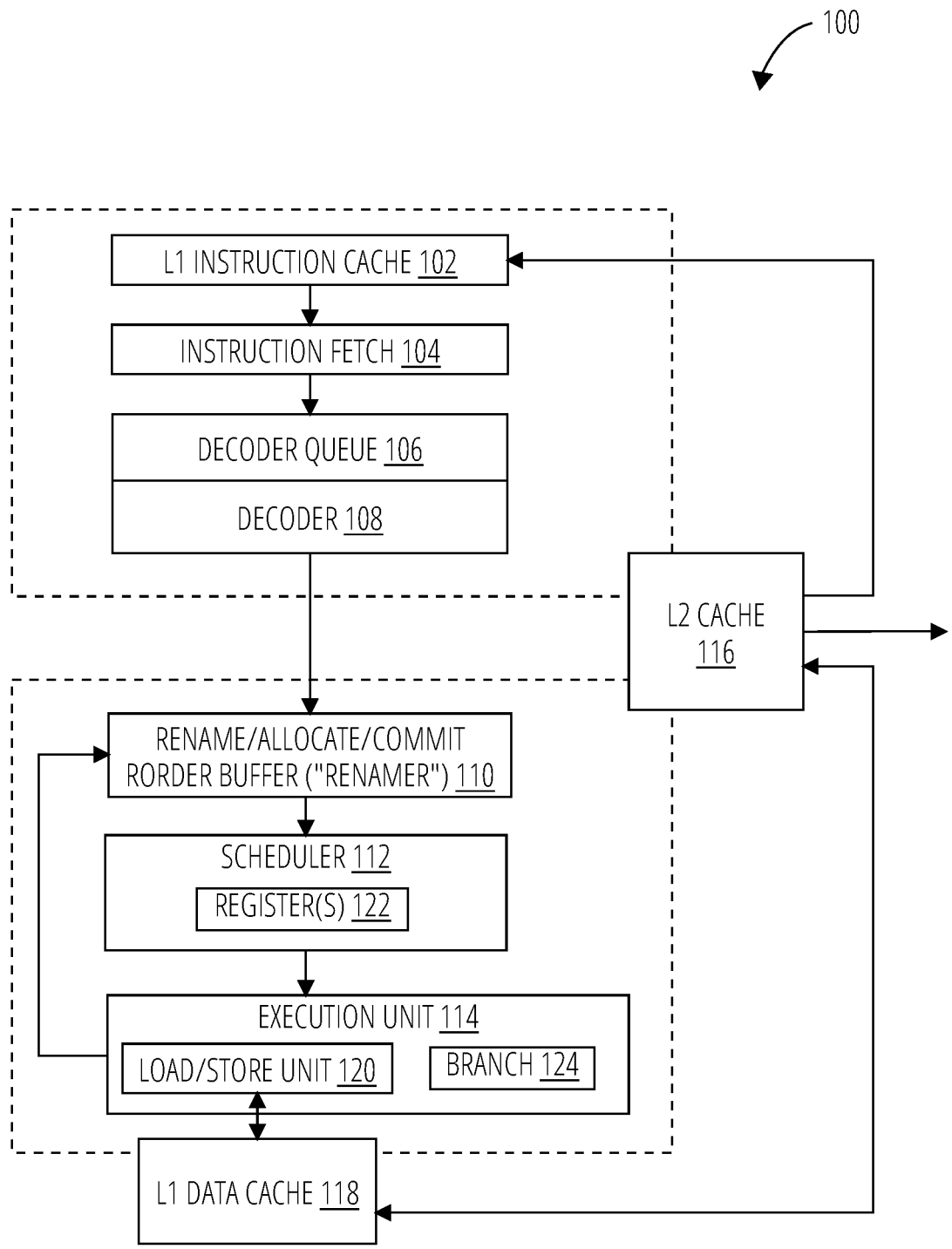
FIG. 1 is a block diagram of an example processor in accordance with aspects of the disclosure.

The technology is generally directed to detecting silent data corruption by selectively re-executing instructions. A renamer may receive decoded instructions from an instruction cache. The renamer may identify one or more of the decoded instructions that can be performed out of order. The renamer may utilize a reorder buffer to track in-flight decoded instructions by, for example, tracking intermediate calculations, their dependencies, and their results. The instructions may dispatch from the reorder buffer, execute, and return their results to the reorder buffer. The reorder buffer may be configured to track instructions that are to be re-executed for purposes of computing their value a second time and comparing the value from the second computation with a value from a first computation. Instructions that are to be re-executed may be, for example, instructions in which the calculations should be performed "n" number of times, where "n" is any value greater than 1.

Prior to retiring, or completing, an instruction, an initial result of executing the instruction a first time may be compared with a re-execution result of re-executing the instruction a second or nth time. If the comparison indicates there is a different initial result than the re-execution result, an indication of possible silent data corruption may be generated for the instruction. If the initial result matches the re-execution result, the instructions may be deemed completed and therefore may be retired and made architecturally visible to other computing units. The reorder buffer may retire the instructions in-order, even if the instructions were executed out of order.

The instructions selected for re-execution may be a certain percentage of the total instructions for a given program. In some examples, the instructions selected for re-execution may be determined based on a period of time. For example, instructions that are executed during a certain time of the day, day of the week, day of the month, etc. may be selected for re-execution. In another example, the instructions selected for re-execution may be determined based on hint instructions embedded within the architecture. The hint instructions may indicate a beginning and ending of a block or sequence of instructions to be re-executed. According to some examples, the sequences of instructions to be re-executed may be automatically identified. For example, a compiler cost model may be used to identify instructions that should be re-executed. In such an example, instructions to be re-executed may be identified based on the type of instruction, its parameters, etc.

The reorder buffer may include additional space, or memory, for the instructions selected for re-execution. For example, the reorder buffer may have designated space for the selected instructions to have "n" number of results. In some examples, the reorder buffer may have "n" number of entries for the same instructions to account for the re-executed instructions. For example, the reorder buffer may have an entry for initial "Instruction A" and a second entry for re-execution "Instruction A'."

One or more barriers may be included to ensure that the re-execution of instructions has been completed prior to retiring the instructions. For example, the barriers may provide an indication of where or when instructions should be re-executed. In some examples, the barrier may identify sequences of instructions to be re-executed. In another example, the barriers may provide an indication of where the comparison between the results of the initial instruction and the results of the re-executed instruction should occur.

Utilizing structures already within the CPU to identify instructions to be re-executed may increase computational efficiency and decrease the form factor of the CPU. For example, by augmenting the internal structures of the core to re-execute only selected instructions, the computational efficiency of the CPU may increase as compared to re-executing all instructions. Further, by augmenting the existing internal structures of the core to re-execute only selected instructions, no additional components are necessary, thereby maintaining, or possibly decreasing, the form factor of the CPU.

According to some examples, including barriers within the architecture may increase computational efficiency by providing an indication of which instructions should be re-executed. Further, the barrier instruction may be ignored by existing CPUs in which selective re-execution is not provided. This allows for selective re-execution of instructions to work within the architecture of most, if not all, CPUs.

FIG. 1 illustrates an example computer processing unit ("CPU") pipeline for a microprocessor core. The microprocessor core 100 may include, for example, an L1 instruction cache 102, instruction fetch 104, decoder queue 106, decoder 108, renamer 110, scheduler 112, execution unit 114, load/store unit 120, L1 data cache 118, and L2 cache 116.

The L1 instruction cache 102 may store instructions, sequences of instructions, and/or information related to the instructions. For example, the L1 instruction cache 102 may store bits that identify whether the instruction is a branch, the type of execution unit needed to execute the instruction, flow history, etc.

The instruction fetch 104 may fetch instructions from the L1 instruction cache 102. The L1 data cache 118 may be, for example, memory configured to store data and/or instructions. According to some examples, the L1 data cache 118 may be split from the instructions. Additionally or alternatively, the L1 data cache 118 may contain instructions. In another example, such as when the L1 data cache 118 does not typically contain instructions, the L1 data cache 118 may contain instructions if the code to be executed is being modified. The instructions stored by L1 data cache 118 may be instructions to be performed by the CPU. The data may be, for example, data on which the instructions are to be performed. According to some examples, the instruction fetch 104 may determine which instructions to fetch based on the bits associated with the instructions, such as the flow history bits.

According to some examples, the data and instructions stored in L1 data cache 118 may additionally be stored in L2 cache 116. The L2 cache 116 may, in some examples, be memory that is located outside of and/or separate from the CPU core. In some examples, the L2 cache 116 may be located on the same processor chip package. The L2 cache 116 may be configured to provide stored information to the one or more processors or other memories, such as L1 instruction cache 102 and L1 data cache 118.

The decoder queue 106 may queue the instructions fetched by instruction fetch 104. The decoder 108 may decode the queued instructions. According to some examples, a branch prediction may be performed when decoder 108 decodes the instructions. The branch prediction may provide an indication of one or more separate sequences of instructions.

The decoded instructions may be transmitted to the renamer 110. The renamer 110 may, additionally or alternatively, be referred to as a rename/allocate/commit buffer. The renamer 110 may be configured to identify which instruction of the decoded stream of instruction can be performed out of order.

In some examples, the renamer 110 may include a reorder buffer. The reorder buffer may keep track of intermediate calculations for the instructions, the dependencies of the instructions, and the result of the instructions. The reorder buffer may track instructions that are performed out of order but may retire instructions in order. For example, the reorder buffer may distinguish between instructions that are speculative as compared to instructions that are able to be retired. Instructions that are speculative may be instructions that include an "if" statement, an instruction in which a branch was predicted, etc. Instructions that are ready to be retired may include, for example, a completion of instructions that have executed properly, as expected, etc.

According to some examples, the reorder buffer may track instructions that are selected or identified to be re-executed. Instructions selected to be re-executed may be re-executed "n" number of times, where "n" is any value greater than 1. According to some examples, the reorder buffer may include additional space, or memory, for each selected instruction to have "n" number of results. Additionally, or alternatively, the renamer 110 may allocate "n" number of entries for the selected instructions. The "n" number of entries may account for the "n" number of times the instruction is to be re-executed.

The instructions to be re-executed may be identified based on "hint" instructions. The hint instructions may identify the beginning and ending of a sequence of instruction, or basic blocks, which are to be re-executed. According to some examples, during fetch, e.g., instruction fetch 104, and decode, e.g., decoder 108, instructions may be identified to be re-executed later. The renamer 110 may allocate reorder buffer entries for the identified instructions.

According to some examples, the instructions to be re-executed may be automatically identified or detected. For example, a compiler cost model may be used to identify instructions to be re-executed based on the type of instruction, the parameters of the instructions, etc.

According to some examples, the microprocessor core 100 may include feedback driven optimization. The feedback driven optimization may be configured to identify instructions to be re-executed based on telemetry received from related or connected CPUs, errors that were detected internally, test programs configured to provoke errors, etc. In such an example, the feedback driven optimization may identify sequences of instructions that are more likely to expose erroneous computation in existing binaries. The identified sequences of instructions may be selected for re-execution.

In some examples, the binaries may be modified to include additional data, such as metadata, related to specific sequences of instructions to be re-executed. In such an example, when the instructions are loaded for execution on a CPU, the additional data may be loaded separately into a CPU visible structure. The CPU visible structure may include, for example, a virtually indexed in-memory buffer that is under the control of the instructions. The additional data may provide information or an indication as to which instructions or sequence of instructions should be re-executed.

The instructions may be transmitted from the renamer 110 to scheduler 112. The scheduler 112 may, in some examples, be referred to as a reservation station. The scheduler 112 may queue the instructions until the instructions are ready to be dispatched to an execution unit 114.

The execution unit 114 may include one or more different sub-units. The sub-units within execution unit 114 may be configured to perform the operations and/or calculations associated with the instructions. The execution unit 114 may perform the instruction in substantially any order. For example, the order the instructions are executed may be determined based on the location of the data, the availability of cache hardware or memory banks, etc. The instructions, therefore, may be performed entirely out of order, partially out of order, in order, etc.

According to some examples, one of the sub-units within the execution unit 114 may be a load/store unit 120. The load/store unit 120 may be configured to execute load and store instructions. For example, the load/store unit 120 may generate a virtual address associated with the load and store instruction. The load/store unit 120 may load data from memory, such as L1 data cache 118, or store data back to memory from registers, such as the register(s) 122 within scheduler 112. The execution unit 114 may, in some examples, include a branch unit 124. The branch unit 124 may be configured to communicate, or transmit, the results of a branch evaluation to other units in the microprocessor core 100. While not shown, execution unit 114 may include additional sub-units, such as integer operations, e.g., add, subtract, multiple, etc., floating point operations, vector operations, and the like.

According to some examples, re-executing the selected instruction stream may be performed using an out of order apparatus within the microprocessor core 100. The instruction stream selected to be re-executed may be buffered prior to being re-executed.

The result of the executed instruction may be transmitted back to the renamer 110. The results may include the results from the initial execution of the instructions and any results from the re-execution of selected instructions. The initial result may be compared to the re-execution results to determine whether silent data corruption has occurred. In examples where the initial results do not match the re-execution results, an indication of possible silent data corruption may be generated to the instructions. In examples where the initial results match the re-execution result, the instructions may be removed from the renamer 110 and retired. Retiring instructions may include, for example, updating the architecture to include the completed instructions. The instructions may be retired in order, even though the instructions were executed out of order.

The comparison of the initial results and the re-executed results may be performed by one or more processors external to the microprocessor core 100. For example, the comparison may be performed by an external assistance microcontroller.

The instructions to be re-executed may be selected as a percentage of the total instructions. As one example, if the total number of instructions to be executed is 1,000, a random sampling of a certain percentage of the 1,000 instructions may be selected to be re-executed. For example, 10% of the instructions may be selected to be re-executed such that 100 of the 1,000 instructions are re-executed. The 100 instructions may be randomly selected, may be selected using a statistical method, etc.

In some examples, the instructions to be re-executed may be selected based on a predetermined period of time. For example, some or all instructions executed during a certain period of time of the day, day of the week, day of the month, etc. may be selected to be re-executed. In another example, the instructions selected for re-execution may be determined based on hint instructions embedded within the architecture, which may indicate a beginning and end of a block or sequence of instructions to be re-executed. In yet another example, the instructions to be re-executed may be automatically identified by a compiler cost model, as discussed above.

According to some examples, the CPU may include one or more barriers. The barriers may be configured to ensure that the re-execution of selected instructions is completed prior to reaching the barrier. For example, the barrier may ensure that the re-execution of instructions and comparison of the results is completed prior to retiring the instructions. According to some examples, the barrier may be a re-execution barrier. In some examples, the barriers may provide an indication of where, when, or which instructions should be re-executed. Additionally, or alternatively, the barriers may provide an indication of where or when the comparison between the initial execution results and the re-execution results should occur.

Figure 2A:
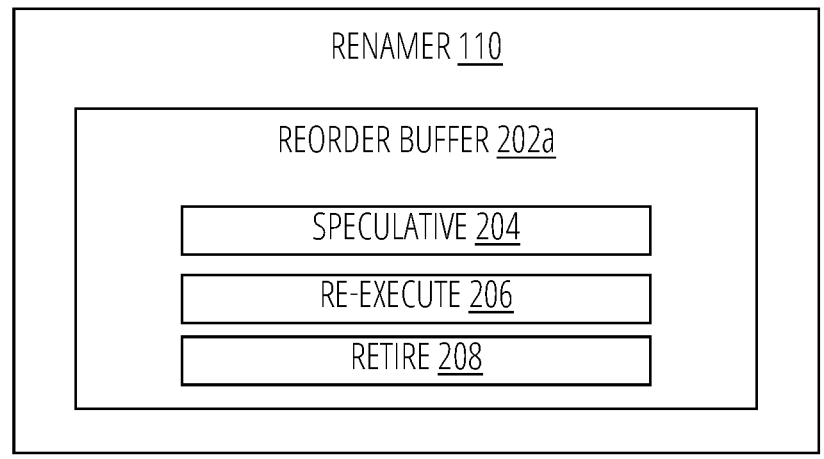
FIG. 2A is a block diagram of an example reorder buffer in accordance with aspects of the disclosure.

FIG. 2A illustrates an example reorder buffer in which additional space has been added for each selected instruction to have "n" number of results. The reorder buffer 202*a* may include space, or memory, for instructions that are identified as speculative 204, re-execute 206, or retire 208.

The speculative memory 204 may store results of instructions identified as speculative until the condition associated with the sequence of instructions is resolved. This may allow for instructions to be executed before knowing whether the instruction is needed. This may prevent delays by not having to wait until it is known the instruction is needed.

The re-execute memory 206 may include enough memory, or space, for "n" number of results for the instructions selected to be re-executed. According to some examples, the "n" number of results may be compared to determine whether possible silent data corruption has occurred or whether the instruction is ready to be retired.

The retire memory 208 may store instructions that are ready to be retired. For example, based on the initial execution results and/or the re-execution results, instructions may be identified as ready to retire from the out of order CPU pipeline. The results generated by executing the instructions may be transmitted from the retire memory 208 to one of the L1 data cache 118 and/or L2 cache 116 before being made visible in the architecture. According to some examples, the instructions may be stored in the retire memory 208 until the sequence of instructions can be retired in order.

Figure 2B:
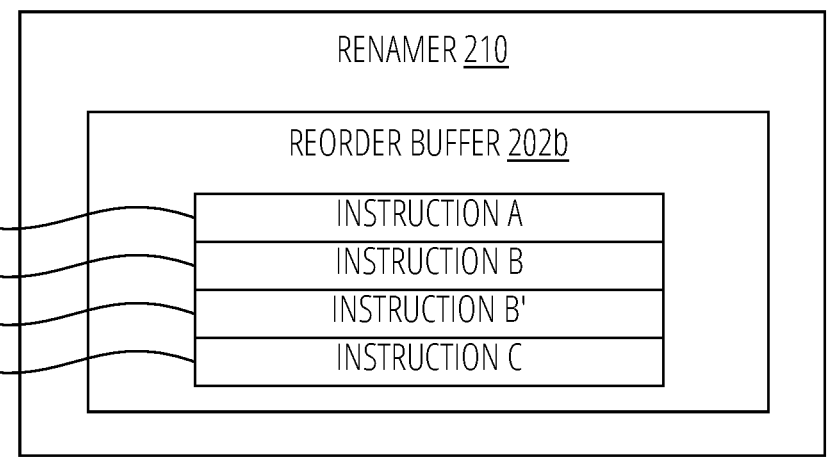
FIG. 2B is a block diagram of another example reorder buffer in accordance with aspects of the disclosure.

FIG. 2B illustrates another example reorder buffer in which multiple instructions are provided for instructions selected to be re-executed. The reorder buffer 202*b* may be within renamer 210 and may include, for example, a plurality of instruction entries, such as entries 212*a*-212*d*. In some examples, the entries may be referred to as lines of storage.

According to some examples, at least some of the plurality of entries for an initial execution of an instruction and at least one additional execution of the same instruction. For example, as shown in FIG. 2B, a first instruction entry 212*b* may be allocated for the initial execution of "Instruction B" and a second instruction entry 212*c* may be allowed for the re-execution of Instruction B, represented as "Instruction B'." The result of "Instruction B" may be compared to the re-execution result of "Instruction B'" to detect possible silent data corruption. In examples where the results of "Instruction B" and "Instruction B'" do not match, an indication, or alert, may be generated for "Instruction B." In examples where the results of "Instruction B" and "Instruction B'" match, Instruction B may be identified as ready to be retired.

According to some examples, there may be "n" number entries allocated in the reorder buffer 202*b* for the instruction selected to be re-executed. For example, if the selected instruction is to be re-executed five times, reorder buffer 202*b* may include five instruction entries for the selected instruction. The result of the initial execution and any subsequent re-execution may be stored in the respective instruction entry within reorder buffer 202*b*. According to some examples, it may be possible to configure which entries of the reorder buffer 202*b* are chosen in order to reduce the likelihood of corruption within the buffer itself.

In some examples, there may be an entry for the initial instruction, and entry for the re-execution instruction, an entry for the initial result, and an entry for the re-execution result. Accordingly, while an entry is shown as storing both the instruction and corresponding result, there may be separate entries for the instruction and corresponding result. The reorder buffer 202*b*, as shown in FIG. 2B, is, therefore, just one example and is not intended to be limiting.

Figure 3:
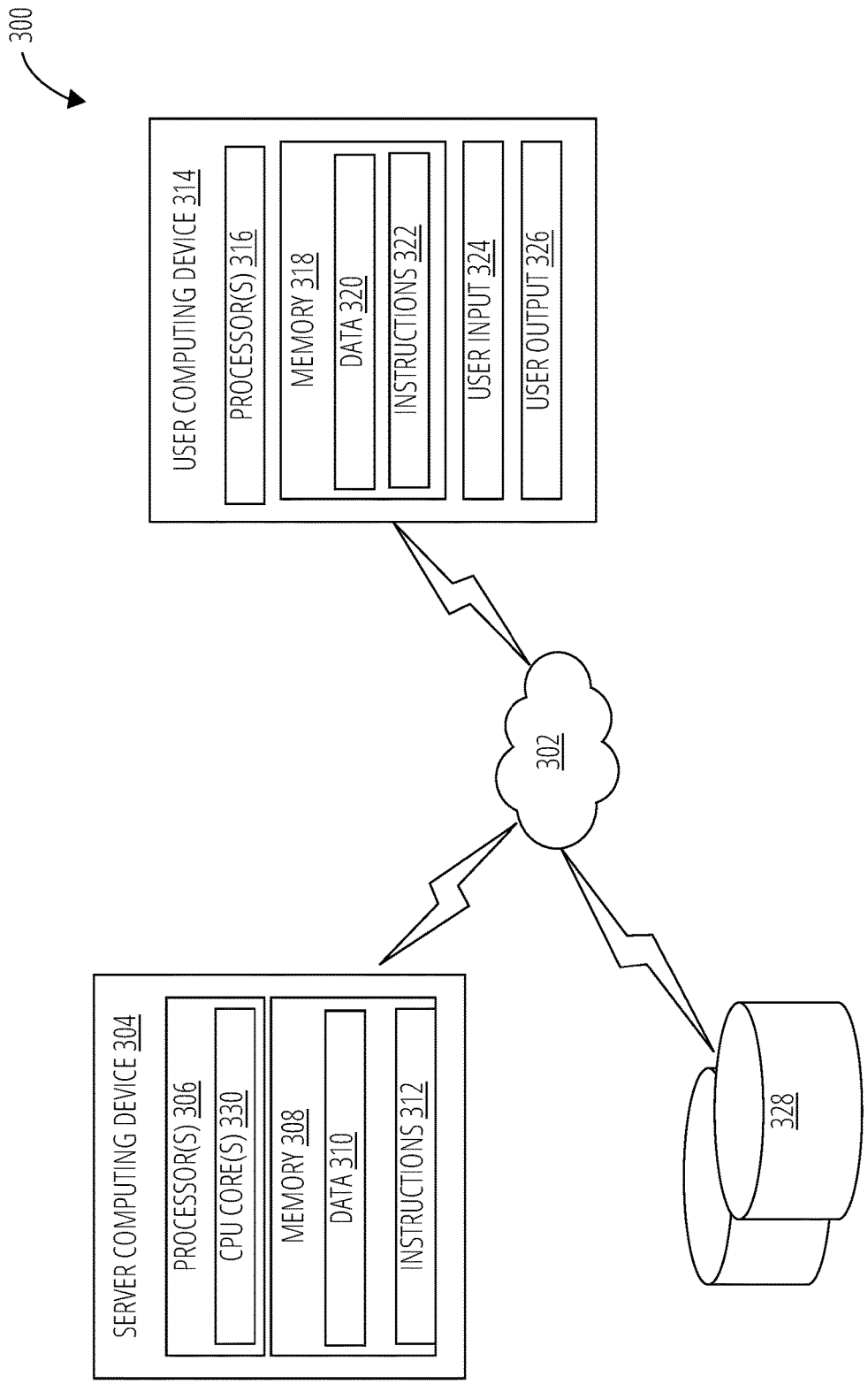
FIG. 3 is a block diagram of an example system in accordance with aspects of the disclosure.

FIG. 3 depicts a block diagram of an example computing environment implementing an example CPU core, such as the CPU described in FIG. 1. For example, the CPU core 330 can be implemented in one or more processors 306, 316 on one or more devices 304, 314 in one or more locations. For example, the CPU core 330 of FIG. 1 may be within a processor 306 in server computing device 304. The server computing device 304 can manage data that is accessed by user computer device 314. If the CPU core of the server computing device fails to detect silent data corruption, errors may occur on the client side. For example, if silent data corruption is not detected, users attempting to access data managed by server computing device 304 may not be able to access the data in its entirety, may access corrupted data, may access partial data, etc.

In one example, the user computing device 314 may execute a remote datacenter monitoring application to determine whether silent data corruption may have occurred. The remote datacenter monitoring application may monitor server computing device 304. In such an example, the remote datacenter monitoring application may receive an indication of possible silent data corruption when the CPU core 330 of the server computer device determines there was a mismatch between the initial result and a re-execution result of a selected instruction.

User computing device 314 and the server computing device 304 can be communicatively coupled to one or more storage devices 328 over a network 302. The storage devices 328 can be a combination of volatile and non-volatile memory and can be at the same or different physical locations than the computing devices 304, 314. For example, the storage devices 328 can include any type of non-transitory computer readable medium capable of storing information, such as a hard-drive, solid state drive, tape drive, optical storage, memory card, ROM, RAM, DVD, CD-ROM, write-capable, and read-only memories.

The server computing device 304 can include one or more processors 306 and memory 308. The memory 308 can store information accessible by the processors, including instructions 312 that can be executed by the processors. The memory 308 can also include data 310 that can be retrieved, manipulated, or stored by the processor. The memory 308 can be a type of transitory or non-transitory computer readable medium capable of storing information accessible by the processors, such as volatile and non-volatile memory. The processors 306 can include one or more central processing units (CPUs), graphic processing units (GPUs), field-programmable gate arrays (FPGAs), and/or application-specific integrated circuits (ASICs), such as tensor processing units (TPUs).

The instructions 312 can include one or more instructions that when executed by the processors, cause the one or more processors to perform actions defined by the instructions. The instructions 312 can be stored in object code format for direct processing by the processors, or in other formats including interpretable scripts or collections of independent source code modules that are interpreted on demand or compiled in advance. The instructions 312 can include instructions for implementing processes consistent with aspects of this disclosure. Such processes can be executed using the processors, and/or using other processors remotely located from the server computing device.

The data 310 can be retrieved, stored, or modified by the processors 306 in accordance with the instructions 312. The data 310 can be stored in computer registers, in a relational or non-relational database as a table having a plurality of different fields and records, or as JSON, YAML, proto, or XML documents. The data 310 can also be formatted in a computer-readable format such as, but not limited to, binary values, ASCII or Unicode. Moreover, the data 310 can include information sufficient to identify relevant information, such as numbers, descriptive text, proprietary codes, pointers, references to data stored in other memories, including other network locations, or information that is used by a function to calculate relevant data.

The user computing device 314 can also be configured similarly to the server computing device 304, with one or more processors 316, memory 318, instructions 322, and data 320. The user computing device 314 can also include a user output 326, and a user input 324. The user input 324 can include any appropriate mechanism or technique for receiving input from a user, such as keyboard, mouse, mechanical actuators, soft actuators, touchscreens, microphones, and sensors.

The server computing device 304 can be configured to transmit data to the user computing device 314, and the user computing device 314 can be configured to display at least a portion of the received data on a display implemented as part of the user output 326. The user output 326 can also be used for displaying an interface between the user computing device and the server computing device. The user output 326 can alternatively or additionally include one or more speakers, transducers or other audio outputs, a haptic interface or other tactile feedback that provides non-visual and non-audible information to the platform user of the user computing device.

Although FIG. 3 illustrates the processors 306, 316 and the memories 308, 318 as being within the computing devices 304, 314, components described in this specification, including the processors 306, 316 and the memories 304, 314 can include multiple processors and memories that can operate in different physical locations and not within the same computing device. For example, some of the instructions 312, 322 and the data 310, 320 can be stored on a removable SD card and others within a read-only computer chip. Some or all of the instructions 312, 322 and data 310, 320 can be stored in a location physically remote from, yet still accessible by, the processors. Similarly, the processors 306, 316 can include a collection of processors that can perform concurrent and/or sequential operation. The computing devices 304, 314 can each include one or more internal clocks providing timing information, which can be used for time measurement for operations and programs run by the computing devices 304, 314.

The server computing device 304 can be configured to receive requests to process data from the user computing device 314. For example, the environment 300 can be part of a computing platform configured to provide a variety of services to users, through various user interfaces and/or APIs exposing the platform services.

The computing devices 304, 314 can be capable of direct and indirect communication over the network 302. The computing devices 304, 314 can set up listening sockets that may accept an initiating connection for sending and receiving information. The network 302 itself can include various configurations and protocols including the Internet, World Wide Web, intranets, virtual private networks, wide area networks, local networks, and private networks using communication protocols proprietary to one or more companies. The network 302 can support a variety of short- and long-range connections. The short- and long-range connections may be made over different bandwidths, such as 2.402 GHz to 2.480 GHz (commonly associated with the Bluetooth® standard), 2.4 GHZ and 5 GHZ (commonly associated with the Wi-Fi® communication protocol); or with a variety of communication standards, such as the LTE® standard for wireless broadband communication. The network 302, in addition or alternatively, can also support wired connections between the computing devices, including over various types of Ethernet connection.

Although a single server computing device 304 and user computing device 314 are shown in FIG. 3, it is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device, and any combination thereof.

Figure 4:
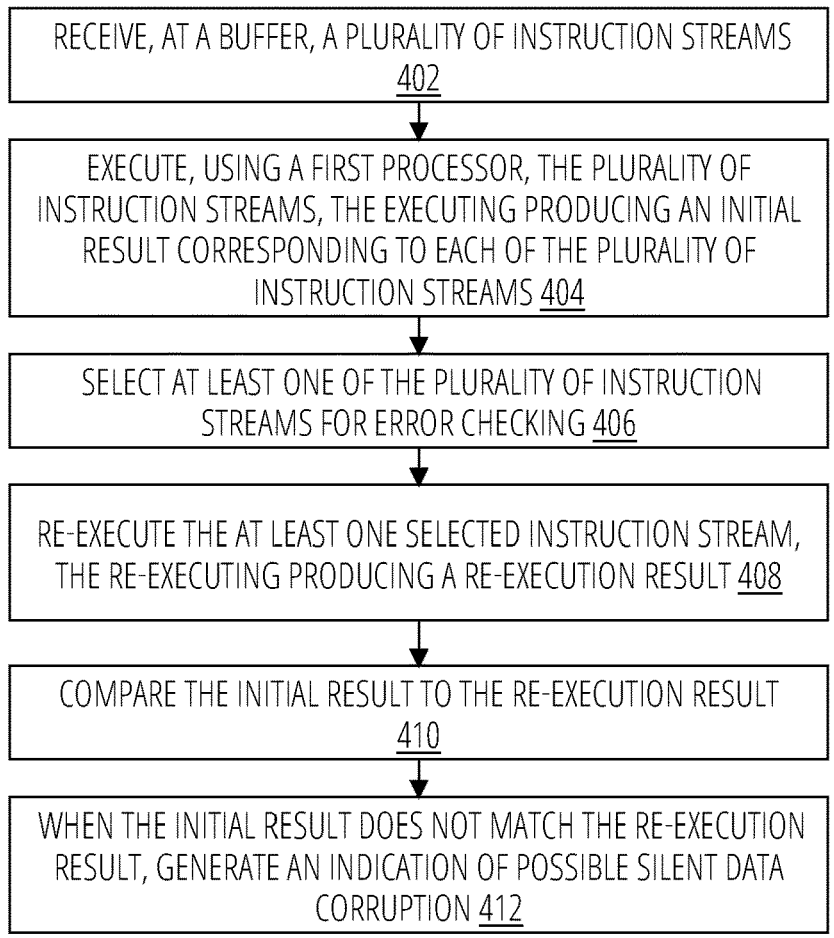
FIG. 4 is a flow diagram for an example method of detecting silent data corruption in accordance with aspects of the disclosure.

FIG. 4 illustrates an example method of detecting silent data corruption. The following operations do not have to be performed in the precise order described below. Rather, various operations can be handled in a different order or simultaneously, and operations may be omitted.

In block 402, a buffer may receive a plurality of instruction streams. The buffer may be, for example, a reorder buffer utilized by a renamer. The renamer may receive decoded instructions. The renamer may identify one or more instruction streams that can be executed out of order.

In block 404, the plurality of instruction streams may be executed by a first processor. According to some examples, the processors may be, for example, within an execution unit of a CPU. The execution of the plurality of instruction streams may produce an initial result for the respective instruction streams. The initial result may be returned to the reorder buffer.

In block 406, at least one of the plurality of instruction streams may be selected for error checking. According to some examples, the instruction stream may be selected based on hint instructions within the architecture. The hint instructions may identify, or provide an indication, of a beginning and ending block of a sequence of instructions. In some examples, the instruction stream may be selected based on which instruction streams may be performed out of order. In some examples, the instruction stream may be selected randomly. In another example, the instruction stream may be selected based on a certain percentage of instruction streams to be checked, a period of time, etc.

In block 408, the at least one selected instruction stream may be re-executed. The selected instruction stream may be re-executed using an out of order apparatus within a microprocessor core. According to some examples, the selected instruction stream may be re-executed using the first processor. In another example, the selected instruction stream may be re-executed using a second processor different than the first processor.

The re-executed selected instruction stream may produce a re-execution result. According to some examples, the re-execution result may be returned to the reorder buffer. The reorder buffer may include space, or memory, allocated for "n" number of re-execution results. In some examples, the reorder buffer may include a plurality of instruction entries. The instruction entry may include an entry for the initial result and "n" number of entries for the re-execution result(s).

In block 410, the initial result may be compared to the re-execution result. According to some examples, one or more barriers may be included to ensure that the instruction stream. The comparison of the initial result to the re-execution result may be performed by one or more processors external to a microprocessor core. The one or more processors performing the comparison may be, for example, an external assistance microcontroller.

In block 412, in examples when the initial result does not match the re-execution result, an indication of possible silent data corruption may be generated. Generating the indication may include flagging the selected instruction stream. Flagging the selected instruction stream may include, for example, setting a bit. According to some examples, generating the indication may include flagging the first process for possible corruption. In examples when the initial result matches the re-execution result, the selected instruction stream is retired to the architecture of a computer processing unit.

In this specification the phrase "configured to" is used in different contexts related to computer systems, hardware, or part of a computer program, engine, or module. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program, engine, or module is said to be configured to perform one or more operations, this means that the computer program includes one or more program instructions, that when executed by one or more computers, causes the one or more computers to perform the one or more operations.

While operations shown in the drawings and recited in the claims are shown in a particular order, it is understood that the operations can be performed in different orders than shown, and that some operations can be omitted, performed more than once, and/or be performed in parallel with other operations. Further, the separation of different system components configured for performing different operations should not be understood as requiring the components to be separated. The components, modules, programs, and engines described can be integrated together as a single system or be part of multiple systems. One or more processors in one or more locations implementing an example method for detecting silent data corruption according to aspects of the disclosure can perform the operations shown in the drawings and recited in the claims.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the examples should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible implementations. Further, the same reference numbers in different drawings can identify the same or similar elements.

The invention claimed is:

1. A method for detecting silent data corruption, comprising:
   receiving, at a buffer, a plurality of instruction streams;
   executing, using one or more processors, the plurality of instruction streams, the executing producing an initial result corresponding to each of the plurality of instruction streams;
   selecting at least one of the plurality of instruction streams, wherein the selecting comprises at least one of:
      identifying, based on hint instructions, a beginning block and an ending block of a respective instruction stream of the plurality of instruction streams and selecting the instruction stream based on the beginning block and the ending block;
      identifying one or more instruction streams of the plurality of instructions streams that can be performed out of order and selecting at least one of the one or more instruction streams;
      identifying a predetermined percentage of the plurality of instruction streams and selecting the at least one of the plurality of instruction streams based on the predetermined percentage; or
      identifying one or more instruction streams of the plurality of instruction streams that are executed during a predetermined period of time and selecting the at least one of the plurality of instruction streams from the identified one or more instruction streams that are executed during a predetermined period of time;
   re-executing, using the one or more processors, the at least one selected instruction stream, the re-executing producing a re-execution result;
   comparing the initial result to the re-execution result; and
   when the initial result does not match the re-execution result, generating an indication of silent data corruption.

2. The method of claim 1, wherein re-executing the at least one selected instruction stream is performed using an out-of-order apparatus within a microprocessor core.

3. The method of claim 1, wherein the comparing is performed by one or more processors external to a microprocessor core.

4. The method of claim 1, further comprising buffering the at least one selected instruction stream prior to the re-executing.

5. The method of claim 1, further comprising storing the initial result in a first physical register and storing the re-execution result in a second physical register that is separate from the first physical register.

6. The method of claim 1, wherein generating an indication of possible silent data corruption comprises flagging a first processor of the one or more processors for possible corruption.

7. The method of claim 6, wherein flagging the at least one selected instruction stream comprises setting a bit.

8. The method of claim 1, wherein:
executing the plurality of streams is performed using a first processor of the one or more processors, and
re-executing the at least one selected instruction stream is performed using the first processor.

9. The method of claim 1, wherein:
executing the plurality of streams is performed using a first processor of the one or more processors, and
re-executing the at least one selected instruction stream is performed using a second processor of the one or more processors, the second processor being different than the first processor.

10. The method of claim 1, wherein when the initial result matches the re-execution result, the at least one selected instruction stream is retired to architecture of a computer processing unit.

11. A system for detecting silent data corruption, comprising:
a memory unit configured to temporarily store instruction streams;
one or more processors, wherein the one or more processors are configured to select at least one of the instruction streams, the selecting comprising at least one of:
identifying, based on hint instructions, a beginning block and an ending block of a respective instruction streams and selecting the instruction stream based on the beginning block and the ending block;
identifying one or more instruction streams of the plurality of instruction streams that can be performed out of order and selecting at least one of the one or more instruction streams;
identifying a predetermined percentage of the plurality of instruction streams and selecting the at least one of the plurality of instruction streams based on the predetermined percentage; or
identifying one or more instruction streams of the plurality of instruction streams that are executed during a predetermined period of time and selecting the at least one of the plurality of instruction streams from the identified one or more instruction streams that are executed during a predetermined period of time; and
a renamer including a reorder buffer, wherein the reorder buffer is configured to:
receive an initial result from execution of the at least one of the instruction streams; and
receive a re-execution result from re-execution of the at least one instruction streams; and
wherein the one or more processors are further configured to:
compare the initial result to the re-execution result; and
when the initial result does not match the re-execution result, generate an indication of silent data corruption.

12. The system of claim 11, wherein
the reorder buffer includes one or more memories, and
at least one of the one or more memories is configured to temporarily store the initial result and the re-execution result of the selected at least one of the instructions streams.

13. The system of claim 11, wherein:
the reorder buffer includes a plurality of instruction entries, and
at least two of the plurality of instruction entries correspond to the selected at least one of the instruction streams.

* * * * *